No. 674,859. Patented May 28, 1901.
J. TRIER.
AUTOMOBILE.
(Application filed Apr. 26, 1900.)
(No Model.)
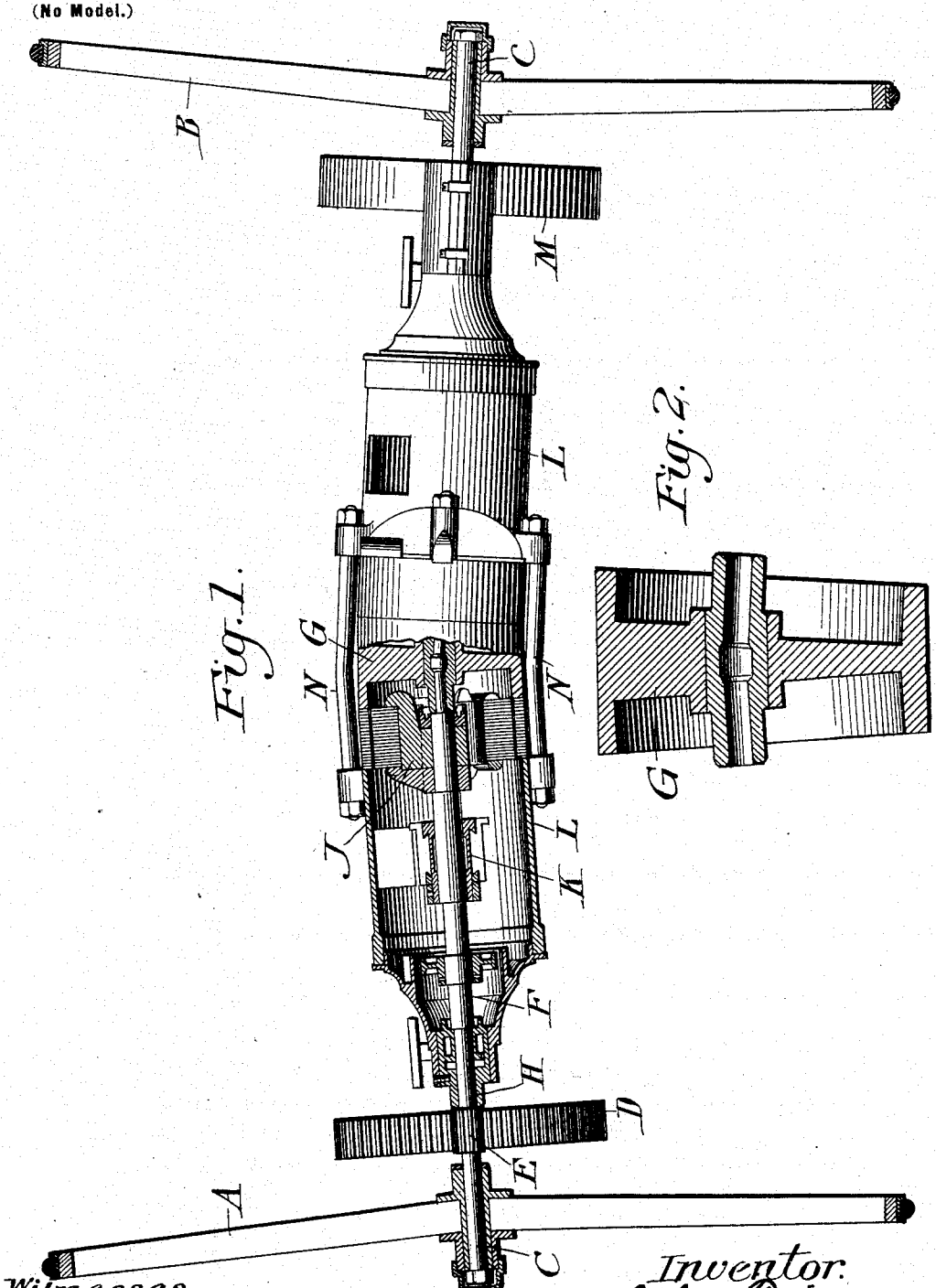

UNITED STATES PATENT OFFICE.

JOHN TRIER, OF CHICAGO, ILLINOIS, ASSIGNOR, BY MESNE ASSIGNMENTS, TO DONALD GRANT, OF FARIBAULT, MINNESOTA.

AUTOMOBILE.

SPECIFICATION forming part of Letters Patent No. 674,859, dated May 28, 1901.

Application filed April 26, 1900. Serial No. 14,397. (No model.)

*To all whom it may concern:*

Be it known that I, JOHN TRIER, a citizen of the United States, residing at Chicago, in the county of Cook and State of Illinois, have invented a new and useful Automobile, Electric Carriage, or Similar Vehicle, of which the following is a specification.

This invention relates to automobiles, electric carriages, or similar vehicles.

The object of the invention is to provide means for securing a proper and desirable angle of inclination of the wheels of automobiles, electric carriages, and similar vehicles with reference to the line of travel of such vehicle.

The invention consists, substantially, in the construction, combination, location, and relative arrangement, all as will be more fully set forth hereinafter, as shown in the accompanying drawings, and finally pointed out in the appended claims.

Referring to the accompanying drawings and to the various views and reference-signs appearing thereon, Figure 1 is a view, partly in front elevation and partly in transverse vertical section, showing my improved construction for securing the proper dish or inclination of the wheels. Fig. 2 is a detail sectional view of the center casting, in which the ends of the sectional axle are journaled.

Heretofore in the construction of automobiles, electric cabs, carriages, and similar vehicles it has not been possible to secure that angle of inclination of the wheels or "dish" which is exceedingly desirable in vehicles of this nature, for the reason that the axle extends transversely of the carriage-frame, with the motor-shaft arranged parallel thereto, and the carriage-wheels are mounted on the ends of the axles to operate in a vertical plane parallel with the plane in which operates the gearing which connects the motor-shaft and axle. This is exceedingly objectionable and undesirable.

It is the purpose of the present invention to provide a construction and arrangement whereby the carriage-wheels may be given a suitable and proper dish or inclination, thereby rendering the vehicle more stable and more efficiently supported.

In carrying out my invention I employ a separate motor for driving each wheel, and I arrange the two motor-shafts in angular relation with respect to each other.

Referring to the accompanying drawings, A B designate two wheels, one arranged on each side of the carriage-body (not shown) and each journaled upon a section of axle C and each provided with the proper and desired dish. In order to permit this dish, the axles C are inclined relative to a horizontal line extending transversely of the vehicle-frame. Upon each axle is mounted a drive-gear D, each drive-gear adapted to be engaged and driven by a pinion E upon a motor-shaft F, and in order to accommodate the angle at which the axles are relatively inclined each motor-shaft F must be correspondingly inclined relative to each other and in parallel relation to their respective axles. In order to secure this result, I journal the inner or proximate ends of the motor-shafts separately and independently in a center casting G. This casting is made in substantially V or wedge shape, as clearly shown in Fig. 2, thereby enabling the motor-shafts to be arranged at the desired relative angle. At their outer ends the motor-shafts are journaled in suitable boxes or bearings (indicated at H) formed in the carriage body or frame in the usual or any well-known or convenient manner. One of the motors is indicated at J, and its commutator is shown at K. The other motor is shown inclosed in its casing L, which casing may also include a gear-casing M for the drive-gear. The casings for the two motors may be suitably held and supported by means of the securing-bolts N.

By providing the center casting G with relatively-inclined end faces the desired relative inclination is given the motor-shafts, thereby enabling me to provide for the proper dishing of the wheels, and the degree of relative inclination of the motor-shafts, and hence the degree of dish of the wheels, is determined by the degree of relative inclination of the end faces or surfaces of the center casting G, in which the inner ends of the motor-shafts are journaled.

The specific construction of the motors employed forms no part of my present invention, and I do not therefore specifically show or describe such construction in all the details thereof.

It will be readily seen from the foregoing description that each wheel of the pair is independently driven. Of course by a suitable system of motor-control said wheels may be driven at the same or at unequal speeds and in the same or in opposite directions. It will also be seen that the entire motor or driving apparatus and gearing is inclosed within the casing, thereby efficiently protecting the same from dust, dirt, or the like, and I secure the desired dish for the wheels.

Having now set forth the object and nature of my invention and a form of construction embodying the principles thereof and having described such construction, its purpose, function, and mode of operation, what I claim as new and useful and of my own invention, and desire to secure by Letters Patent, is—

1. In an automobile, electric carriage or similar vehicle, a pair of traction-wheels, an axle for each wheel, a driving-motor for each axle, the axle and driving-motor of one wheel being inclined relatively to the axle and driving-motor for the other wheel, whereby said wheels may be dished, as and for the purpose set forth.

2. In an automobile, electric carriage or similar vehicle, a pair of traction-wheels, an axle for each wheel, a driving-motor for each axle, a central casting having relatively-inclined journal-bearings for the inner or proximate ends of both driving-motor shafts, whereby said shafts are inclined relative to each other, as and for the purpose set forth.

3. In an automobile, electric carriage or similar vehicle, a pair of wheels, a driving-motor for each wheel, the shafts of said motors disposed transversely of the carriage-body and suitably geared to their respective wheels, and a central casting forming a journal-bearing for the inner ends of both motor-shafts, the journal-bearings of said shafts being relatively inclined to each other, whereby said shafts are disposed in angular relation to each other, to permit a dish in the wheels, as and for the purpose set forth.

4. In an auto truck or vehicle, a pair of traction-wheels, a motor for each wheel, a center piece interposed between the adjacent ends of the motor-shafts, said center piece having relatively-inclined journal-bearings adapted to receive the proximate ends of said shafts, whereby the shafts of said motors are inclined with respect to each other to provide a dish to the wheels, as and for the purpose set forth.

In witness whereof I have hereunto set my hand, this 10th day of March, 1900, in the presence of the subscribing witnesses.

JOHN TRIER.

Witnesses:
  E. C. SEMPLE,
  S. E. DARBY.